United States Patent [19]

Fujita

[11] Patent Number: 5,112,786
[45] Date of Patent: May 12, 1992

[54] CATALYST FOR POLYMERIZATION OF OLEFIN MONOMERS

[75] Inventor: Takashi Fujita, Yokkaichi, Japan

[73] Assignee: Mitsubishi Petrochemical Company Limited, Tokyo, Japan

[21] Appl. No.: 717,514

[22] Filed: Jun. 19, 1991

[30] Foreign Application Priority Data

Jun. 21, 1990 [JP] Japan .................. 2-163409

[51] Int. Cl.$^5$ .............................. C08F 4/656
[52] U.S. Cl. ...................... 502/119; 502/108; 502/115; 502/116; 502/118; 502/125; 502/133; 502/134; 526/125
[58] Field of Search ............ 502/108, 115, 116, 118, 502/119, 125, 133, 134

[56] References Cited

U.S. PATENT DOCUMENTS

| | | | |
|---|---|---|---|
| 4,579,836 | 4/1986 | Arzoumanidis et al. | 502/133 |
| 4,721,763 | 1/1988 | Bailly et al. | 502/108 X |
| 4,942,148 | 7/1990 | Forohashi et al. | 502/108 X |
| 4,983,561 | 1/1991 | Sasaki et al. | 502/116 X |
| 5,021,382 | 6/1991 | Malpass | 502/108 X |
| 5,085,612 | 5/1991 | Kioka et al. | 502/133 |

Primary Examiner—Patrick P. Garvin
Attorney, Agent, or Firm—Oblon, Spivak, McClelland, Maier & Neustadt

[57] ABSTRACT

A catalyst for polymerization of olefin monomers, comprising Component (A) which is a solid catalytic compound obtained by subjecting at least the following three compounds to a contact reaction; Sub-component (i) which is a component for Ziegler catalysts comprising titanium, magnesium and a halogen; Sub-component (ii) which is a silicon compound represented by the formula $R^1{}_{4-n}SiX_n$ wherein $R^1$ is a hydrocarbyl group having 1 to 20 carbon atoms, X is a halogen, and n is a number in the range of $0<n\leq4$, and Sub-component (iii) which is divinylbenzene, the amount of said Sub-component (iii) polymerized in the course of the contact reaction being from 0.01 to 10 g per 1 g of the Sub-component (i), and Component (B) which is an organoaluminum compound.

When polymerizing $\alpha$-olefin monomers having three or more carbon atoms, the catalyst of this invention does not require a process of preliminary polymerization of the monomers, which process is substantially needed when the monomers are polymerized in the presence of a conventional catalyst.

6 Claims, No Drawings

CATALYST FOR POLYMERIZATION OF OLEFIN MONOMERS

BACKGROUND OF THE INVENTION

1. Field of the Invention

This invention relates to a catalyst for polymerization of olefin monomers, and more particularly to a catalyst which can give, with high yields, polymers having high stereoregularity when used for polymerization of olefin monomers having three or more carbon atoms.

To polymerize olefin monomers having three or more carbon atoms such as propylene monomers by using a conventional catalyst, the monomers are, in general, subjected to what is called preliminary polymerization before conducting main polymerization; otherwise a polymer having high stereoregularity would not be obtained in a powder state having good properties such as bulk density, particle size distribution. The catalyst according to the present invention, however, does not require such a process of preliminary polymerization of

2. Description of the Related Art

In recent years, there have been proposed various methods for preparing polymers having high stereospecificity, in which α-olefin monomers having three or more carbon atoms are subjected to stereospecific polymerization in the presence of a solid catalyst component containing as requisite components titanium, magnesium and a halogen. In the above conventional methods, a process of preliminary polymerization of the monomers may be indispensable. In most cases, however, preliminary polymerization of the catalyst employed. For this reason, there has been a demand for the development of a catalyst suitable for polymerization of olefin monomers having three or more carbon atoms, which does not require a process of preliminary polymerization of monomers, and can give polymers having high stereospecificity.

SUMMARY OF THE INVENTION

Accordingly, an object of the present invention is to provide a Ziegler-type catalyst for polymerization of capable of overcoming the foregoing drawbacks in the art.

The above object of the invention can be attained by a catalyst for polymerization of olefin monomers, comprising Component (A) which is a solid catalytic component obtained by subjecting at least the following component (i) which is a solid component for Ziegler catalysts comprising titanium, magnesium and a halogen, Sub-component (ii) which is a silicon compound having the formula $R^1_{4-n}SiX_n$ wherein $R^1$ is a hydrocarbyl group having 1 to 20 carbon atoms, X is a halogen, and n is a number in the range of $0<n\leq4$, and Sub-component (iii) which is divinylbenzene, the amount of the Sub-component (iii) polymerized in the course of the contact reaction being from 0.01 to 10 g per 1 g of the Sub-component (i), and Component (B) which is an organoaluminum compound.

When olefin monomers are polymerized in the presence of the above catalyst of the present invention, polymer yield in a powder state having good properties such as bulk density, particle size distribution without subjecting the monomers to preliminary polymerization with propylene or the like, which is required for polymerization of olefin monomers using a conventional catalyst.

Moreover, when preparing the Component (A), the Sub-component (iii), viz. divinylbenzene, can be compound such as an organoaluminum compound which has conventionally been required for preliminary polymerization of divinylbenzene. In general, a catalyst produced through a process of preliminary polymerization using an organometallic compound has the shortcomings of low catalytic activity and poor physical characteristics. The present invention, therefore, can also eliminate these shortcomings.

DETAILED DESCRIPTION OF THE PREFERRED EMBODIMENTS

The catalyst for polymerization of olefin monomers according to the present invention comprises specific Components (A) and (B), which will be hereinafter explained in detail. The language "comprise" means that the components are not restricted only to those indicated, viz. A and B, but includes the use of a third component which is compatible with the present invention.

Component (A)

The Component (A) is a solid catalytic component obtained by subjecting the following three components, Sub-components (i), (ii) and (iii), to contact with each other. The language "obtained by subjecting the three components to contact with each other" means that the components are not restricted only to those indicated, viz. (i) to (iii), but include the use of a further component which is compatible with the present invention.

Sub-component (i):

The Sub-component (i) is a component for Ziegler catalysts comprising as essential elements titanium, magnesium, and a halogen. The language "comprising as essential elements" means that the elements are not a further element which is compatible with the present invention, and that these elements concerned can be comprised in the Sub-component (i) in any suitable compounds of each of the elements and/or between some of these elements. The component for Ziegler catalysts which contains titanium, magnesium, and a halogen is known in the art, and those disclosed in Japanese Laid-open Patent Applications Nos. 53-45688, 54-3894, 54-31092, 54-39483, 54-94591, 54-118484, 54-131589, 55-75411, 55-90510, 55-90511, 55-127405, 55-147507, 55-155003, 56-18609, 56-70005, 56-72001, 56-86905, 56-90807, 56-155206, 57-3803, 57-34103, 57-92007, 57-121003, 58-5309, 58-5310, 58-5311, 58-8706, 58-27732, 58-32604, 58-32605, 58-67703, 58-117206, 58-127708, 58-183708, 58-183709, 59-149905 and 59-149906 are usable in the present invention.

Examples of a magnesium compound which can be a source of the magnesium in the Sub-component (i) include magnesium dihalides, dialkoxymagnesiums, alkoxymagnesium halides, magnesium oxyhalides, dialkylmagnesiums, magnesium oxide, magnesium hydroxide, and magnesium carboxylates. Of these compounds, magnesium dihalides are preferred.

Examples of a titanium compound which can be a source of the titanium in the Sub-component (i) include compounds represented by the formula:

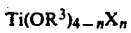

$Ti(OR^3)_{4-n}X_n$ wherein $R^3$ is a hydrocarbyl group, preferably a hydrocarbyl group having approximately 1 to 10 carbon atoms, X is a halogen, and n is a number of from 0 to 4.

Specific examples of the titanium compounds having the above formula include $TiCl_4$, $TiBr_4$, $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-nC_4H_9)Cl_3$, $Ti(O-nC_4H_9)_2Cl_2$, $Ti(OC_2H_5)Br_3$, $Ti(OC_2H_5)(OC_4H_9)_2Cl$, $Ti(O-nC_4H_9)_3Cl$, $Ti(O-C_6H_5)Cl_3$, $Ti(O-iC_4H_9)_2Cl_2$, $Ti(OC_5H_{11})Cl_3$, $Ti(OC_6H_{13})Cl_3$, $Ti(OC_2H_4)$, $Ti(O-nC_3H_7)_4$, $Ti(O-nC_4H_9)_4$, $Ti(O-iC_4H_9)_4$, $Ti(O-nC_6H_{13})_4$, $Ti(O-nC_8H_{17})_4$, and $Ti[OCH_2CH(C_2H_5)C_4H_9]_4$.

A molecular compound obtained by reacting a compound represented by the formula $TiX'_4$, in which $X'$ is a halogen, with an electron donor which will be described hereinbelow in more detail can also be used as a source of the titanium element. Specific examples of such molecular compounds include $TiCl_4 \cdot CH_3COC_2H_5$, $TiCl_4 \cdot CH_3CO_2H_5$, $TiCl_4 \cdot C_6H_5NO_2$, $TiCl_4 \cdot CH_3COCl$, $TiCl_4 \cdot C_6H_5COCl$, $TiCl_4 \cdot C_6H_5CO_2C_2H_5$, $TiCl_4 \cdot ClCOC_2H_5$, and $TiCl_4 \cdot C_4H_4O$.

In addition to the above compounds, titanium compounds such as $TiCl_3$ prepared by, for instance, reducing $TiCl_4$ with $H_2$, with metallic aluminum, or with an organometallic compound, $TiBr_3$, $Ti(OC_2H_5)Cl_2$, $TiCl_2$, and dicyclopentadienyltitanium dichloride are also employable as sources of the titanium element.

Among the above-enumerated titanium compounds, $TiCl_4$, $Ti(OC_4H_9)_4$, and $Ti(OC_2H_5)Cl_3$ are preferable.

The halogen to be comprised in the Sub-component (i) is conveniently supplied from the above-described halogenated compounds of magnesium and/or titanium. However, known halogenating agents such as halogenated compounds of aluminum, halogenated compounds of silicon and halogenated compounds of phosphorus are also usable as sources of the halogen.

The halogen comprised in the Sub-component (i) is selected from fluorine, chlorine, bromine, iodine, and a mixture thereof. Of these, chlorine is preferable in the present invention.

Besides the above-described essential elements of magnesium, titanium and a halogen, the Sub-component (i) can further comprise an additional element such as an aluminum compound such as $Al(O-iC_3H_7)_3$, $AlCl_3$, $AlBr_3$, $Al(OC_2H_5)_3$ or $Al(OCH_3)_2Cl$, a boron compound such as $B(OCH_3)_3$, $B(OC_2H_5)_3$ or $B(OC_6H_5)_3$, or another metal halide such as $WCl_6$ or $MoCl_5$. It is acceptable that the elements such as aluminum and boron contained in these compounds remain in the Sub-component (i).

When preparing the Sub-component (i), an electron donor can be used as an internal donor.

Examples of the electron donor (internal donor) usable in the present invention include electron donors containing oxygen such as alcohols, phenols, ketones, aldehydes, carboxylic acids, esters of an organic acid or inorganic acid, ethers, acid amides, acid anhydrides, and electron donors containing nitrogen such as ammonia, amines, nitriles and isocyanates.

Specific examples of the electron donors include:

(a) alcohols having 1 to 18 carbon atoms such as methanol, ethanol, propanol, pentanol, hexanol, octanol, dodecanol, octadecyl alcohol, benzyl alcohol, phenylethyl alcohol, and isopropylbenzyl alcohol;

(b) phenols which have 6 to 25 carbon atoms and may or may not contain an alkyl substituent, such as phenol, cresol, xylenol, ethylphenol, propylphenol, isopropylphenol, nonylphenol and naphthol;

(c) ketones having 3 to 15 carbon atoms such as acetone, methyl ethyl ketone, methyl isobutyl ketone, acetophenone and benzophenone;

(d) aldehydes having 2 to 15 carbon atoms such as acetaldehyde, propionaldehyde, octylaldehyde, benzaldehyde, tolualdehyde and naphthaldehyde;

(e) esters of an organic acid having 2 to 20 carbon atoms such as methyl formate, methyl acetate, ethyl acetate, vinyl acetate, propyl acetate, octyl acetate, cyclohexyl acetate, cellosolve acetate, ethyl propionate, methyl butyrate, ethyl valerate, ethyl stearate, methyl chloroacetate, ethyl dichloroacetate, methyl methacrylate, ethyl crotonate, ethyl cyclohexanoate, methyl benzoate, ethyl benzoate, propyl benzoate, butyl benzoate, octyl benzoate, cyclohexyl benzoate, phenyl benzoate, benzyl benzoate, cellosolve benzoate, methyl toluate, ethyl toluate, amyl toluate, ethyl ethylbenzoate, methyl anisate, ethyl anisate, ethyl ethoxybenzoate, diethyl phthalate, dibutyl phthalate, diheptyl phthalate, $\gamma$-butyrolactone, $\alpha$-valerolactone, coumarine, phthalide and ethylene carbonate;

(f) esters of an inorganic acid having a lower alkyl group or a phenyl group as the alcohol residue, such as for instance esters of silicic acid such as ethyl silicate, butyl silicate and phenyl triethoxy silane;

(g) acid halides having 2 to 15 carbon atoms such as acetyl chloride, benzoyl chloride, toluic acid chloride, anisic acid chloride, phthaloyl chloride and isophthaloyl chloride;

(h) ethers having 2 to 20 carbon atoms such as methyl ether, ethyl ether, isopropyl ether, butyl ether, amyl ether, tetrahydrofuran, anisole and diphenyl ether;

(i) acid amides having 1 to 10 carbon atoms, such as acetic acid amide, benzoic acid amide and toluic acid amide;

(j) amines having 1 to 21 carbon atoms, such as methylamine, ethylamine, diethylamine, tributylamine, piperidine, tribenzylamine, aniline, pyridine, picoline and tetramethylethylenediamine; and (k) nitriles having 2 to 10 carbon atoms, such as acetonitrile, benzonitrile and tolunitrile.

The above-enumerated electron donors can be employed either singly or in combination.

Among the above electron donors, esters of an organic acid and acid halides are preferred; and phthalates, cellosolve acetate and phthalic acid halides are more preferably employed in the present invention.

The above elements can be incorporated into the Sub-catalyst can exhibit the effects of the present invention. However, the following amounts are, in general, preferred.

The amount of the titanium compound is from $1 \times 10^{-4}$ to 1000 times, preferably from 0.01 to 10 times, the amount of the magnesium compound on molar basis. In the case where a halogen-containing compound is used as a source of a halogen, the amount of such a compound is from $1 \times 10^{-2}$ to 1000 times, preferably from 0.1 to 100 times, the amount of the magnesium compound on molar basis whether or not the titanium compound and/or magnesium compound contains a halogen.

In the case where a silicon, aluminum or boron compound is incorporated into the Sub-component (i), the amount of such a compound is from $1 \times 10^{-3}$ to 100 times, preferably from 0.1 to 1 times, the amount of the magnesium compound on molar basis.

When the electron donor is employed, the amount thereof is from $1 \times 10^{-3}$ to 10 times, preferably from 0.01 to 5 times, the amount of the magnesium compound on molar basis.

The Sub-component (i) can be prepared, using the above-mentioned titanium compound, magnesium compound, halogen-containing compound, and if necessary other compounds such as the electron donor, in accordance with one of the following preparation methods:

(1) A method in which a halogenated magnesium and if necessary the electron donor are brought into contact with a compound containing titanium.

(2) A method in which a halogenated magnesium, the electron donor and a compound of titanium containing halogen are brought into contact with alumina or magnesia which has been treated with a halogenated compound of phosphorus in advance.

(3) A method in which a halogenated compound of titanium and/or halogenated compound of silicon is brought into contact with a solid compound prepared by subjecting a halogenated magnesium, a titanium tetraalkoxide, and a specific polymeric silicon compound to a contact reaction.

A polymer represented by the following formula is preferably employed in this method as the polymeric silicon compound:

$$\left(\begin{array}{c} H \\ | \\ Si-O \\ | \\ R \end{array}\right)_n$$

wherein R is a hydrocarbyl group having approximately 1 to 10 carbon atoms, and n is such a number that the polymer has a viscosity of from 1 to 100 centistokes.

Specific examples of the polymeric silicon compounds include methylhydrogen polysiloxane, ethylhydrogenpolysiloxane, phenylhydrogenpolysiloxane, cyclohexylhydrogenpoly siloxane, 1, 3, 5, 7-tetramethylcyclotetrasiloxane, and 1, 3, 5, 7, 9-pentamethylcyclopentasiloxane.

(4) A method in which a titanium compound is brought into contact with a solid compound which is a precipitate obtained by dissolving a magnesium compound in titanium tetraalkoxide having an alkyl group, preferably a lower alkyl group, and an electron donor, followed by precipitation using a halogenating agent or a halogenated compound of titanium.

(5) A method in which an organomagnesium compound such as a Grignard reagent is reacted with a halogenating agent or reducing agent, and then, if necessary, brought into contact with an electron donor and a titanium compound.

(6) A method in which a halogenating agent and/or titanium compound is brought into contact with an alkoxymagnesium compound in the presence or absence of an electron donor.

Of the above methods, methods (3) and (4) are preferable for the preparation of the Sub-component (i).

Sub-component (ii):

The Sub-component (ii) to be used for preparing the Component (A) of this invention is a silicon compound represented by the following formula $$R^1{}_{4-n}SiX_n$$

wherein $R^1$ is a hydrocarbyl group having 1 to 20 carbon atoms, X is a halogen, and n is a number in the range of $0 < n \leq 4$.

Typical examples of $R^1$ in the above formula are an alkyl group, an alkenyl group, a phenyl group, a cyclohexyl group, a phenyl group having as a substituent a lower alkyl group having approximately 1 to 15 carbon atoms, and a cyclohexyl group having as a substituent a lower alkyl group having approximately 1 to 15 carbon atoms.

Specific examples of the Sub-component (ii) include $SiCl_4$, $SiBr_4$, $CH_3SiCl_3$, $C_2H_5SiCl_3$, $C_4H_9SiCl_3$, $C_6H_{13}SiCl_3$, $C_{10}H_{21}SiCl_3$, $(CH_3)_2SiCl_2$, $(C_2H_5)_2SiCl_2$, $(C_3H_8)_2SiCl_2$, $(C_4H_9)_2$, $(CH_{2=CH})SiCl_3$, $C_6H_{11}SiCl_3$, $C_6H_5SiCl_3$, $(C_5H_{11})$ $(CH_3)SiCl_2$, $C_2H_5SiBr_3$, $C_7H_{11}SiCl_3$, $(C_5H_{11})(CH_3)SiCl_2$, (phenyl-$CH_2$)$SiCl_3$, and $C_{20}H_{41}SiCl_3$.

Among the silicon compounds having the above formula, those compounds having a lower alkyl group having 1 to 3 carbon atoms as $R^1$, chlorine as X, and a number of 3 or 4 as n are preferred.

Sub-component (iii):

The Sub-component (iii) to be used for preparing the Component (A) of the present invention is divinylbenzene.

Examples of the divinylbenzene include ortho-divinylbenzene, metha-divinylbenzene, para-divinylbenzene, and a mixture thereof.

Preparation of Component (A):

No particular limitation is imposed on the conditions for preparing the Component (A). It is, however, preferable that the Sub-components (i), (ii) and following conditions:

Namely, it is desirable that the contact reaction be out at a temperature of approximately from $-50°$ C. $200°$ C., preferably from $0°$ C. to $100°$ C., and more preferably from $20°$ C. to $50°$. The Sub-components may be mechanically brought into contact with each other by medium-stirring pulverizer. Alternatively, they are brought into contact with each other by stirring in the presence of an inert diluent such as an aliphatic hydrocarbon, a halogenated aliphatic hydrocarbon, an aromatic hydrocarbon, a halogenated aromatic hydrocarbon, or a polysiloxane.

When preparing Component (A) of the present invention, it is preferable to polymerize the Sub-component (iii) by subjecting the Sub-components (i) and (iii) to a contact reaction in the presence of the Sub-component (ii).

No particular limitation is imposed on the amounts of the Sub-components (i), (ii) and (iii) used for the preparation of the Component (A). However, in general, the Sub-components (i) and (ii) are used in such a proportion that the ratio of the amount of silicon contained in the Sub-component (ii) to the amount of titanium contained in the Sub-component (i), that is, the atomic ratio of silicon/titanium, falls in the range of from 0.01 to 1000, preferably from 0.1 to 100.

The amount of the Sub-component (iii) which is polymerized is from 0.01 to 10 times, preferably from 0.1 to 5 times, the amount of the Sub-component (i) on weight basis.

Component (B)

The Component (B) of the catalyst according to the present invention is an organoaluminum compound.

Examples of the organoaluminum compound usable in the present invention are compounds represented by the formula $R^4{}_{3-n}AlX_n$ in which $R^4$ is a hydrocarbyl group having approximatley 1 to 20 carbon atoms, preferably a lower alkyl, or hydrogen atom, X is a halogen, and n is a number in the range of $0 \leq n < 3$, and compounds represented by the formula $R^5{}_{3-m}Al(OR^6)_m$ in which $R^5$ is a hydrocarbyl group having approximately 1 to 20 carbon atoms, preferably a lower alkyl, and m is a number in the range of $0<m<3$.

Specific examples of the above organoaluminum compounds include:

(a) trialkylaluminums such as trimethylaluminum, triethylaluminum, triisobutylaluminum, trihexylaluminum, trioctylaluminum and tridecylaluminum;

(b) alkylaluminum halides such as diethylaluminum monochloride, diisobutylaluminum monochloride, ethylaluminum sesquichloride and ethylaluminum dichloride;

(c) alkylaluminum hydrides such as diethylaluminum hydride and diisobutylaluminum hydride; and (d) aluminum alkoxides such as diethylaluminum ethoxide and diethylaluminum phenoxide.

In combination with the above-enumerated organoaluminum compounds (a) to (d), alkylaluminum alkoxides represented by the following formula can be employed:

$$R^7{}_{3-a}Al(OR^8)_a$$

wherein $R^7$ and $R^8$, which may be the same or different, each represents a hydrocarbyl group having approximately to 20 carbon atoms, preferably a lower alkyl, and a is a number of from 1 to 3.

For instance, the combination use of triethylaluminum and diethylaluminum ethoxide, the combination use of diethylaluminum monochloride and diethylaluminum ethoxide, the combination use of ethylaluminum dichloride and ethylaluminum diethoxide, and the combination use of triethylaluminum, diethylaluminum ethoxide and diethylaluminum chloride are acceptable in the present invention.

The weight ratio of the Component (B) to the Component (A) ((B)/(A)) is from 0.1 to 1000, preferably from 1 to 100.

Use of the Catalyst/Polymerization

The catalyst according to the present invention is applicable not only to slurry polymerization but also to liquid-phase/non-solvent polymerization which employs substantially no solvent, solution polymerization and gas phase polymerization. Furthermore, the catalyst of the invention can also be used for continuous polymerization, batch polymerization, and polymerization containing a process of prepolymerization.

Examples of solvents for use in slurry polymerization include saturated aliphatic or aromatic hydrocarbons such as hexane, heptane, pentane, cyclohexane, benzene and toluene. These solvents are used either singly or in combination. The polymerization temperature is from room temperature to approximately 200° C., preferably from 50° to 150° C.; the polymerization pressure is from atmospheric pressure to approximately 300 kg/cm², preferably from atmospheric pressure to 50 kg/cm², and hydrogen can be optionally used in order to control the molecular weight of the resulting polymer.

An electron donor such as an ester, an ether or an amine can also be employed as a third component so as to control the stereospecificity of the resulting polymer.

In the case where the catalyst of this invention is used for slurry polymerization, it is preferable that the amount of the Component (A) be in the range of from 0.001 g to 0.1 g for 1 liter of a solvent employed.

By using the catalyst of the present invention, α-olefins having the following formula can be successfully polymerized:

$$R-CH=CH_2$$

wherein R is hydrogen atom, or a linear or branched hydrocarbyl group having 1 to 10 carbon atoms.

Specific examples of the α-olefins include olefins such as ethylene, propylene, 1-butene, 1-pentene, 1-hexene, and 4-methylpentene. Of these olefins, ethylene and propylene are preferred.

The above olefins can be polymerized either singly or in combination in the presence of the catalyst of the present invention. For instance, in the case of copolymerization of ethylene and the other olefin, the other olefin can be used in an amount of 50% by weight or less, preferably 20% by weight or less, of the amount of the ethylene; and in the case of copolymerization of propylene and the other olefin, in particular, ethylene, the other olefin can be used in an amount of 30% by weight or less of the amount of the propylene. Furthermore, the above olefin can be copolymerized with other copolymerizable monomer such as vinyl acetate or diolefin in the presence of the catalyst of the invention.

Other features of this invention will become apparent in the course of the following description of exemplary embodiments, which are given for illustration of this invention and are not intended to be limiting thereof.

EXAMPLE 1

Preparation of Component (A)

A flask which had been thoroughly purged with nitrogen gas was charged with 200 ml of dehydrated and deoxygenated n-heptane. 0.4 mol of MgCl₂ and 0.8 mol of Ti(O—nC₄H₉)₄ were then added to the n-heptane, and the resulting mixture was subjected to a reaction at 95° C. for two hours. After the reaction was completed, the reaction mixture was cooled to a temperature of 40° C., and 48 ml of methylhydrogenpolysiloxane having a viscosity of 20 centistokes was added thereto, followed by reaction for three hours. A solid product thus obtained was washed with n-heptane.

A flask thoroughly purged with nitrogen gas was charged with 50 ml of dehydrated and deoxygenated n-heptane, and 0.24 mol (Mg atom basis) of the above-obtained solid product was then added to the n-heptane. To the resulting mixture was added a mixture of 25 ml of n-heptane, and 0.4 mol of SiCl4 at 30° C. over a period of 30 minutes, followed by reaction at 70° C. for 3 hours. After the reaction was completed, the reaction product was washed with n-heptane. A mixture of 25 ml of n-heptane and 0.024 mol of phthalic acid chloride was then added to the reaction product at 70° C. over a period of 30 minutes, and the resulting mixture was then subjected to a reaction at 90° C. for one hour.

After the above reaction was completed, the reaction product was washed with n-heptane, thereby to obtain a Sub-component (i). It was found that 2.18% by weight of titanium was contained in the Sub-component (i).

A flask which had been thoroughly purged with nitrogen gas was charged with 50 ml of purified n-heptane. To the n-heptane, 5 g of the Sub-component (i), 10 ml of SiCl4 as a Sub-component (i), and 7.5 g of methadivinylbenzene as a Sub-component (iii) in the order named, and the resulting mixture was subjected to a contact reaction at 50° C. for two hours. After the reaction was completed, the reaction product was thoroughly washed with n-heptane, thereby to obtain a Component (A) of the present invention.

It was found that 0.31 g of the Sub-component (iii) had been polymerized per 1 g of the Sub-component (i).

Polymerization of Propylene Monomers

In a 1.5 liter autoclave made of stainless steel, equipped with a stirrer and a temperature controller were placed 500 ml of throughly dehydrated and deoxygenated n-heptane, 125 mg of triethylaluminum as a Component (B), and 26.8 mg of diphenyldimethoxysilane as an auxiliary component. The mixture was heated to a temperature of 75° C., and 60 ml of hydrogen was introduced to the autoclave. Thereafter, propylene was further introduced to the autoclave to increase the inner pressure to 5 kg/cm$^2$G. The Component (A) containing 15 mg of the Sub-component (i) was added to the above reaction mixture with propylene. The resulting reaction mixture was then subjected to polymerization, which was carried out under the conditions of a pressure of 5 kg/cm$^2$G, a temperature of 75° C., and a time of two hours. After the polymerization, the polymer was obtained from the above-obtained polymer slurry by filtration, and then dried. As a result, 165.4 g of polypropylene was obtained. From the filtrate, a further crop of 0.45 g of polypropylene was obtained. The polymer thus obtained had a total product I.I. (hereinafter referred to as T-I.I) of 98.8% by weight, determined by an extraction test carried out using boiling heptane, an MFR of 2.2 g/10 minutes, and a bulk density of 0.43 g/cc.

EXAMPLE 2

Preparation of Component (A)

A flask which had been thoroughly purged with nitrogen gas was charged with 200 ml of dehydrated and deoxygenated n-heptane. 0.4 mol of MgCl$_2$ and 0.8 mol of Ti(O—nC$_4$H$_9$)$_4$ were then added to the n-heptane, and the resulting mixture was subjected to a reaction at 95° C. for two hours. After the reaction was completed, the reaction mixture was cooled to a temperature of 40° C., and 60 ml of 1,3,5,7,9-pentamethylcyclopentasiloxane was added thereto, followed by reaction for three hours. A solid product thus obtained was washed with n-heptane.

A flask thoroughly purged with nitrogen gas was charged with 50 ml of dehydrated and deoxygenated n-heptane, and 0.24 mol (Mg atom basis) of the above obtained solid product was then added to the n-heptane. To the resulting mixture was added a mixture of 25 ml of n-heptane and 0.8 mol of SiCl$_4$ at 30° C. over a period of 30 minutes, followed by reaction at 90° C. for 3 hours. After the reaction was completed, the reaction product component (i).

A flask which had been thoroughly purged with nitrogen gas was charged with 50 ml of purified n-heptane. To the n-heptane, 5 g of the Sub-component (i), and 5 ml of SiCl$_4$ as a Sub-component (ii) were added, and the resulting mixture was subjected to a reaction at 70° C. for two hours. 10g of metha-divinylbenzene was then added to the above reaction mixture as a Sub-component (iii) to carry out a contact reaction. After the reaction was completed, the reaction product was thoroughly washed with n-heptane. 1.8 ml of (t—C$_4$H$_9$)(CH$_3$)Si(OCH$_3$)$_2$ was added to the reaction product as an auxiliary component, and a contact reaction was carried out at 30° C. for two hours. After the reaction was completed, the reaction product thus obtained was thoroughly washed with n-heptane, thereby obtaining a Component (A) of the present invention.

It was found that 0.36 g of the Sub-component (iii) had been polymerized per 1 g of the Sub-compnent (i).

Polymerization of Propylene Monomers

The polymerization procedure in Example 1 was repeated except that the diphenyldimethoxysilane used in Example 1 as an auxiliary component was not employed. As a result, 108.3 g of polypropylene was obtained. The polymer thus obtained was determined to have a T-I.I of 97.8% by weight, an MFR of 3.9 g/10 minutes, and a bulk density of 0.42 g/cc.

EXAMPLE 3

Preparation of Component (A)

The procedure for preparing the Component (A) in Example 1 was repeated except that 10 ml of SiCl$_4$ used in Example 1 as the Sub-component (ii) and 7.5 g of methadivinylbenzene used in Example 1 as the Sub-component (iii) were respectively replaced by 8 ml of (CH$_3$)SiCl$_3$ and 5 g of ortho-divinylbenzene, thereby obtaining a Component (A) of the present invention.

It was found that 0.21 g of the Sub-component (iii) had been polymerized per 1 g of the Sub-component (i).

Polymerization of Propylene Monomers

The polymerization procedure in Example 1 was repeated except that the polymerization temperature was changed from 75° to 70° C. As a result, 141.6 g of polypropylene was obtained. The polymer thus obtained was determined to have a T-I.I. of 98.9% by weight, an MFR of 2.6 g/10 minutes, and a bulk density of 0.45 g/cc.

COMPARATIVE EXAMPLE 1

Preparation of Component (A)

The procedure for preparing the Component (A) in Example 1 was repeated except that the methadivinylbenzene used in Example 1 as the Sub-component (iii) was not used, thereby to obtain a Comparative Component (A).

Polymerization of Propylene Monomers

The polymerization procedure in Example 1 was repeated except that the Component (A) used in Example 1 was replaced by the above-obtained Comparative Component (A). As a result, 93.6 g of polypropylene was obtained. The polymer thus obtained was determined to have a T-I.I. of 97.1% by weight, an MFR of 5.4 g/10 minutes, and a bulk density of 0.33 g/cc.

COMPARATIVE EXAMPLE 2

Preparation of Component (A)

The procedure for preparing the Component (A) in Example 2 was repeated except that the methadivinylbenzene used in Example 2 as the Sub-component (iii) was not used, thereby to obtain a Comparative Component (A).

POLYMERIZATION OF PROPYLENE MONOMERS

The polymerization procedure in Example 2 was repeated except that the Component (A) used in Example 2 was replaced by the above-obtained Comparative Component (A). As a result, 66.1 g of polypropylene was obtained. The polymer thus obtained was determined to have a T-I.I. of 94.9% by weight, an MFR of 6.8 g/10 minutes, and a bulk density of 0.35 g/cc.

EXAMPLE 4

Preparation of Component (A)

The procedure for preparing the Component (A) in Example 1 was repeated except that 0.4 mol of $SiCl_4$ used in Example 1 to obtain the Sub-component (i) was replaced by 0.95 g of $WCl_6$, and 10 ml of $SiCl_4$ used in Example 1 as the Sub-component (ii) was replaced by 15 ml of $(C_{10}H_{21})SiCl_3$, thereby to obtain a Component (A) of the present invention.

It was found that 0.48 g of the Sub-component (iii) had been polymerized per 1 g of the Sub-component (i).

Polymerization of Propylene Monomers

The polymerization procedure in Example 1 was repeated except that 26.8 mg of diphenyldimethoxysilane used in Example 1 was replaced by 50 mg of diphenyldimethoxymethane. As a result, 111.6 g of polypropylene was obtained. The polymer thus obtained was determined to have a T-I.I. of 98.1% by weight, an MFR of 3.8 g/10 minutes, and a bulk density of 0.42 g/cc.

EXAMPLE 5

Polymerization of Propylene Monomers

The polymerization procedure in Example 4 was repeated except that 50 mg of diphenyldimethoxymethane used in Example 4 was replaced by 32.5 mg of methylcyclohexyldimethoxysilane. As a result, 133.5 g of polypropylene was obtained. The polymer thus obtained was determined to have a T-I.I. of 98.3% by weight, an MFR of 2.4 g/10 minutes, and a bulk density of 0.43 g/cc.

EXAMPLE 6

Polymerization of Propylene Monomers

The polymerization procedure in Example 4 was d in Example 4 was relaced by 19.3 mg of diisopropyldimethoxysilane. As a result, 130.6 g of polypropylene was obtained. The polymer thus obtained was determined to have a T-I.I. of 98.2% by weight, an MFR of 3.1 g/10 minutes, and a bulk density of 0.44 g/cc.

What is claimed is:

1. A catalyst for polymerization of olefin monomers, comprising:
   Component (A) which is a solid catalytic compound obtained by subjecting at least the following Sub-components (i) to (iii) to a contact reaction:
   Sub-component (i) which is a component for Ziegler catalysts comprising titanium, magnesium and a halogen as essential components;
   Sub-component (ii) which is a silicon compound represented by the formula $R^1_{4-n}SiX_n$ wherein $R^1$ is a hydrocarbyl group having 1 to 20 carbon atoms, X is a halogen, and n is a number in the range of $0 < n \leq 4$; and
   Sub-component (iii) which is divinylbenzene, the amount of said Sub-component (iii) polymerized in the course of said contact reaction being from 0.01 to 10 g
   Component (B) which is an organoaluminum compound.

2. A catalyst for polymerization of olefin monomers according to claim 1, wherein said Sub-component (i) is prepared in the presence of an electron donor.

3. A catalyst for polymerization of olefin monomers according to claim 1, wherein said Sub-component (i) is prepared by one of the following methods (1) to (6):
   (1) A method in which a halogenated magnesium and if necessary an electron donor are brought into contact with a compound containing titanium;
   (2) A method in which a halogenated magnesium, an electron donor and a compound of titanium containing a halogen are brought into contact with alumina or magnesia which has been treated with a halogenated compound of phosphorus in advance;
   (3) A method in which a halogenated compound of titanium and/or halogenated compound of silicon is brought into contact with a solid compound prepared by subjecting a halogenated magnesium, a titanium tetraalkoxide, and a polymeric silicon compound having the following formula to a contact reaction:

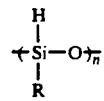

wherein R is a hydrocarbyl group having 1 to 10 carbon atoms, and n is such a number that the polymer has a viscosity of from 1 to 100 centistokes;
   (4) A method in which a titanium compound is brought into contact with a solid compound which is a precipitate obtained by dissolving a magnesium compound in a titanium tetraalkoxide and an electron donor, followed by precipitation using a halogenating agent or a halogenated compound of titanium;
   (5) A method in which an organomagnesium compound is reacted with a halogenating agent or reducing agent, and then, if necessary, brought into contact with an electron donor and a titanium compound; or
   (6) A method in which a halogenating agent and/or titanium compound is brought into contact with an alkoxymagnesium compound in the presence or absence of an electron donor.

4. A catalyst for polymerization of olefin monomers according to claim 1, wherein said Sub-component (i) is prepared by one of the following methods:
   a method in which a halogenated compound of titanium and/or halogenated compound of silicon is brought into contact with a solid compound prepared by subjecting a halogenated magnesium, a titanium tetraalkoxide, and a polymeric silicon compound having the following formula to a contact reaction:

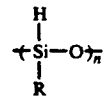

wherein R is a hydrocarbyl group having 1 to 10 carbon atoms, and n is such a number that the polymer has a viscosity of from 1 to 100 centistokes; or
   a method in which a titanium compound is brought into contact with a solid compound which is a precipitate obtained by dissolving a magnesium compound in a titanium tetraalkoxide and an electron donor, followed by precipitation using a halogenating agent or a halogenated compound of titanium.

5. A catalyst for polymerization of olefin monomers according to claim 1, wherein said silicon compound is a compound represented by said formula, wherein $R^1$ is a lower alkyl group having 1 to 3 carbon atoms, X is chlorine, and n is 3 or 4.

6. A catalyst for polymerization of olefin monomers according to claim 1, wherein said Component (A) is prepared by polymerizing said Sub-component (iii) by a contact reaction between said Sub-component (i) and said Sub-component (iii) in the presence of said Sub-component (ii).

* * * * *